United States Patent [19]
Reidemeister et al.

[11] Patent Number: 5,239,871
[45] Date of Patent: Aug. 31, 1993

[54] CAPACITIVE ACCELEROMETER

[75] Inventors: Eric P. Reidemeister, Arlington; Steven Beringhause, N. Attleboro; Keith W. Kawate, Attleboro Falls; Larry K. Johnson, No. Attleboro, all of Mass.

[73] Assignee: Texas Instruments Incorporated, Dallas, Tex.

[21] Appl. No.: 628,249

[22] Filed: Dec. 17, 1990

[51] Int. Cl.⁵ .......................................... G01P 15/125
[52] U.S. Cl. .................. 73/517 R; 361/280; 73/497
[58] Field of Search ............... 73/517 R, 517 B, 497; 361/280, 283

[56] References Cited
U.S. PATENT DOCUMENTS

| | | | |
|---|---|---|---|
| 3,226,981 | 1/1966 | Mullins et al. | 73/517 R |
| 3,339,419 | 9/1967 | Wilcox | 73/517 B |
| 3,673,873 | 7/1972 | Estes et al. | 73/517 B |
| 4,250,757 | 2/1981 | Hanson | 73/517 B |
| 4,658,647 | 4/1987 | Shintani et al. | 73/517 B |
| 4,736,629 | 4/1988 | Cole | 73/517 R |
| 4,932,258 | 6/1990 | Norling | 73/517 B |

Primary Examiner—John E. Chapman
Attorney, Agent, or Firm—Russell E. Baumann; Richard L. Donaldson; Rene E. Grossman

[57] ABSTRACT

An accelerometer has a capacitor detect plate defined on an electrically insulating substrate adjacent a capacitor source plate connector and has circuit paths on the substrate connected to the detect plate and source plate connector. A resilient metal plate has an attachment portion secured to the source plate connector, has a capacitor source plate portion, has integral first beam elements extending away from the attachment portion and has a second beam element extending from the first beam elements back toward the attachment portion to dispose the capacitor source plate in spaced relation to the detect plate to form a capacitor having selected initial capacitance. The capacitor source plate member portion is movable relative to the detect plate to modify device capacitance in response to acceleration. Electronic components are mounted on the substrate connected to the circuit paths to provide an output signal corresponding to the acceleration. Preferably the device is mounted on a housing base with a part of the device substrate carrying the metal member extending over a housing recess to isolate that device end from thermal stresses in an accelerometer unit. Preferably the detect plate, source plate connector, resilient metal member, are provided on and soldered on a plurality of detachable sections of a ceramic insulating substrate in a batch process, and the substrate sections are then separated to form a plurality of accelerometer devices.

16 Claims, 4 Drawing Sheets

CAPACITIVE ACCELEROMETER

BACKGROUND OF THE INVENTION

The field of this invention is that of accelerometers, and the invention relates more particularly to accelerometers which are adapted to be manufactured with high reliability and uniformity at low cost for use in large volume applications.

Capacitive accelerometers and the like of various types as shown in U.S. Pat. No. 4,483,194 to Rudolph, U.S. Pat. No. 4,435,737 to Colton, RE 31,459 to Block, and U.S. Pat. No. 3,240,073 to Pitzer are commonly used or proposed for use in aircraft applications and the like where the accelerometers are likely to be subjected to shock, vibration and severe temperature changes but where the accelerometers are required to display reliable and accurate performance characteristics. However, many of these applications are poorly served with such accelerometers or force transducers either because the devices are manufactured with limited performance capability or at excessive cost. It would be desirable if a capacitive accelerometer could be provided with desired reliability and responsiveness while being manufactured with uniformity at low cost.

BRIEF SUMMARY OF THE INVENTION

It is an object of this invention to provide a novel and improved accelerometer device; to provide such an accelerometer device which is mounted securely and reliably in a sealed accelerometer unit particularly adapted for use in vehicle applications; to provide such an accelerometer device or unit which is characterized by reliability and responsiveness; to provide such an accelerometer device or unit which is adapted to be manufactured with uniformity at low cost; and to provide novel and improved methods for manufacturing such accelerometers.

Briefly described, the novel and improved accelerometer device of the invention comprises an electrically insulating substrate of a ceramic or other rigid support material such as is conventionally used in printed circuit boards and the like. An electrically conducting surface layer such as a copper or other metal film metallization or the like is provided on the substrate to define a fixed capacitor plate or detect plate on the substrate and also to define a capacitor source plate connector on the substrate at a location closely adjacent to the capacitor detect plate. Preferably the electrically conducting layer also defines circuit path means on the substrate which are connected to the capacitor detect plate and the source plate connector and which are preferably arranged to receive electrical circuit components thereon and to be connected in an electrical circuit.

An electrically conductive metal plate member of stiffly resilient, preferably low expansion, metal such as the materials commonly called Kovar, Invar or Alloy 42 or the like is provided with an attachment plate portion, a capacitor source plate portion, and with integral resilient beam member which extend between the attachment plate and source plate portions of the member. Preferably the beam means comprise a pair of resilient beam elements which extend in parallel relation to each other from the attachment plate portion of the member—preferably from respective ends of the attachment plate portion—to dispose distal ends of the pair of beam elements at a selected location spaced from the attachment plate portion of the member. A second beam element is connected to the distal ends of the first pair of beam elements and extends back toward the attachment plate portion of the member to support the capacitor source plate adjacent the attachment plate portion of the member. This closely spaces the source plate relative to the attachment plate location for achieving more uniform, repeatable initial capacitance from device to device in volume manufacture and minimizes thermally responsive movement of the source plate relative to the attachment plate and therefore relative to the detect plate, thereby to minimize thermal drift of the device.

The attachment plate portion of the metal member is secured to the substrate in electrically conductive relation to the capacitor source plate connector means provided on the substrate to dispose the capacitor source plate portion of the member in selected spaced relation to the fixed or detect capacitor plate on the substrate, thereby to form a capacitor having a selected initial capacitance and to permit movement of the capacitor source plate of the member in response to acceleration forces to modify that capacitance as a function of the acceleration. In one embodiment of the invention, the metal plate member is flat and a shim means is soldered, brazed, welded or epoxied between the attachment plate portion of the member and the source plate connector means to mount the source plate member portion in the desired spaced relation to the detect plate on the substrate. In another preferred embodiment, the metal plate member is etched or otherwise reduced in thickness, preferably at the top and bottom, within the capacitor source plate portion of the member so that, when the attachment plate member portion is secured to the source plate connector on the substrate, the capacitor source plate has the desired spacing relative to the detect plate. If desired, the metal member is secured to the source plate connector means by rivet means or other conventional means. Preferably stop means are also mounted on the source plate connector means to extend over the capacitor source plate portion of the metal member in spaced relation thereto to limit movement of that source plate member portion away from the detect plate when the device is subjected to shock or other acceleration forces. Preferably a cover is also sealed to the substrate over the metal member to exclude particles or other extraneous materials from the member area.

Electronic components such as integrated circuit means or the like are preferably connected to the detect plate and source plate connector means, preferably by being mounted on the device substrate, to provide an output signal from the accelerometer device which corresponds to the acceleration force or change in the device capacitance with acceleration. Preferably the accelerometer device is mounted in a covered housing of a thermally insulating material or the like and is sealed within the housing to be protected from the environment in which the assembled accelerometer unit is to be used. Preferably the accelerometer device has one end of the device substrate mounted on a base portion of the unit housing so that the opposite end of the substrate accommodating the detect and source plate of the device capacitor extends over a housing base recess, thereby to isolate the end of the device carrying the metal member from thermal stresses in the housing.

In accordance with the method of the invention, the substrate is provided in the form of a sheet material having a plurality of detachable sections, the electrically conducting means are deposited on all of the sections at the same time, and metal members are also disposed on each of the substrate sections together with electronic means and simultaneously soldered or secured to the substrate sections before the sections are separated to form individual accelerometer devices of uniform properties.

DESCRIPTION OF THE DRAWINGS

Other objects, advantages and details of the accelerometer unit, device and method of the invention appear in the following detailed description of preferred embodiments of the invention, the detailed description referring to the drawings in which.

DESCRIPTION OF THE PREFERRED EMBODIMENTS

Figure 1:
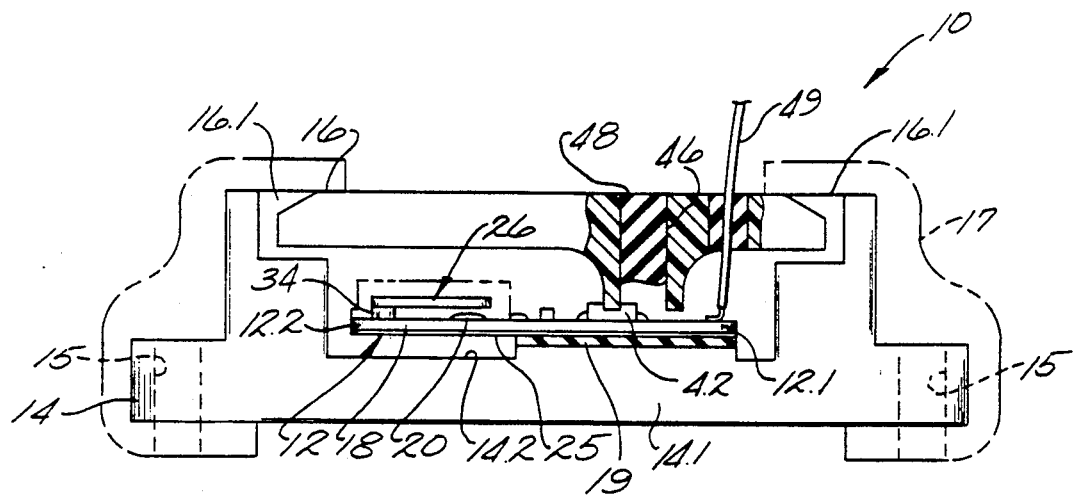
FIG. 1 is a section view along an axis of the accelerometer unit of the invention.

Referring to the drawings, 10 in FIG. 1 indicates the novel and improved accelerometer unit of the invention which is shown to include an accelerometer device 12 mounted within a unit housing 14 and sealed within the housing by a cover 16 using a sealant 16.1. Preferably the housing and cover are formed of thermally insulated plastic materials or the like and the housing base 14.1 has a recess 14.2 formed therein, the accelerometer device having one end 12.1 mounted on the base so that an opposite end 12.2 of the device extends over the base recess to isolate that end of the device from thermal stresses within the housing such as might be due possible thermal expansion mismatch at the housing/substrate interface. Preferably the unit has mounting holes 15 for securing the device in use. Preferably also the unit is provided with shock absorption means to reduce risk of damage to the beam. Preferably for example a sleeve 17 of compressible or resilient material or the like such as rubber, polyurethane or styrofoam or the like is attached around the unit housing to avoid shock damage if the unit is dropped. The sleeve preferably covers unit corners but also covers the entire device if desired. Also if desired a resilient pad 19 is secured between the substrate and the base by adhesives or the like not shown to further reduce the risk of shock damage.

Figure 2:
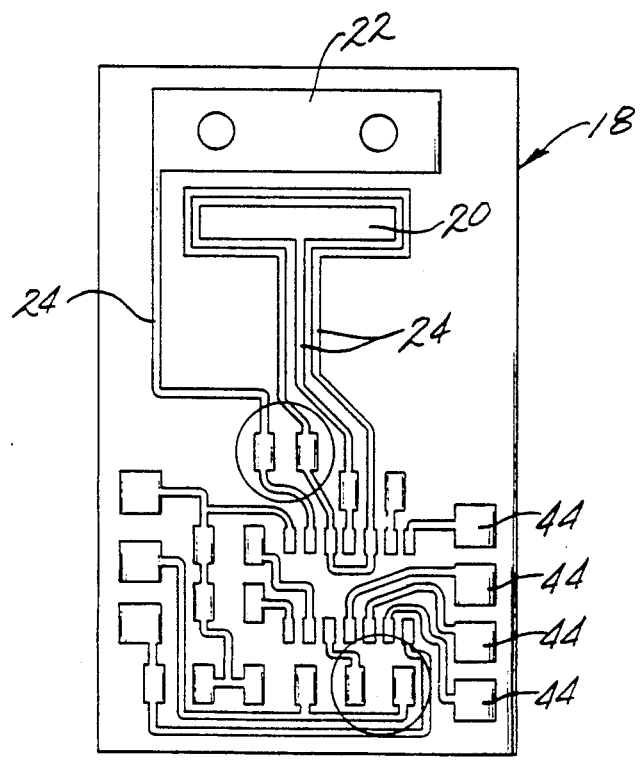
FIG. 2 is a top plan view to enlarged scale of a substrate used in an accelerometer device incorporated in the accelerometer unit shown in FIG. 1.
Figures 3, 4, 5:
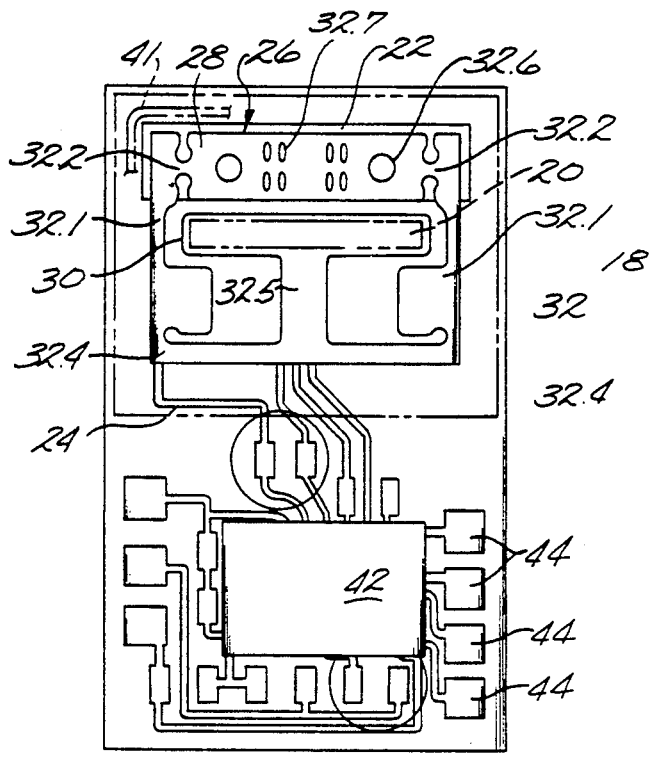
FIG. 3 is a top plan view to enlarged scale of the accelerometer device of the invention incorporating the substrate of FIG. 2.
FIG. 4 is a partial section view to enlarged scale along line 4—4 of FIG. 3.
FIG. 5 is a partial section view similar to FIG. 4 illustrating an alternate embodiment of the accelerometer device of the invention.

As shown particularly in FIGS. 2 and 3, the accelerometer device 12 comprises an electrically insulating substrate 18 which is preferably formed of a rigid ceramic material such as alumina or the like but which is also adapted to be made from any of the rigid electrically insulating materials commonly used in printed circuit board substrates and the like. An electrically conducting surface such as copper or aluminum film metallizations or the like are provided on the substrate as shown particularly in FIG. 2 to define a fixed capacitor plate or detect plate 20, preferably near one end of the substrate 18, and to define a capacitor source plate connector 22 closely adjacent to the detect plate, the source plate connector preferably being located closer to said end of the substrate. Preferably the electrically conductive portions also define circuit paths as indicated at 24 which are electrically connected to the detect plate 20 and to the source connector 22 to connect the detect plate and source plate connector in an electrical circuit. Preferably a metal shield layer 25 is provided on the back side of the substrate as indicated in FIG. 1.

An electrically conductive metal plate member 26 of a stiffly resilient and preferably very flat material is provided with an attachment plate portion 28 at one end of the member, with a capacitor source plate portion 30 closely adjacent to the attachment plate portion, and with integral beam 32 extending between the attachment plate and source plate portions of the member. Preferably the beam member comprise a first beam portion having a pair of beam elements 32.1 connected to respective opposite sides of the attachment plate portion by parts 32.2 of the member which are of relatively much smaller cross section. The pair of beam elements 32.1 extend in parallel relation to each other away from the attachment plate portion of the member to dispose distal ends 32.4 of the pair of beam elements at a location spaced from the attachment plate member portion 28. A second beam portion 32.5 is connected to the distal ends of the first pair of beam elements and extends back toward the attachment plate portion 28 of the member. If desired, the attachment plate portion is provided with rivet hole 32.6 or the like and/or with solder regulating holes or slots 32.7. Preferably the plate member is formed of a metal material such as the metals commonly called Kovar, Invar or Alloy 42 (nominally 42% nickel, balance iron) having a relatively low coefficient of thermal expansion.

The attachment plate 28 of the member is secured in electrically conductive relation to the capacitor source plate connector means 22 on the substrate so that the capacitor source plate portion 30 of the member is normally disposed in a selected, originally, spaced relation to the capacitor detect plate 20 to form a device capacitor having selected original capacitance and to permit movement of the capacitor source plate 30 toward or away from the fixed detect capacitor plate in response to acceleration forces to modify that capacitance as a function of the device acceleration. Preferably the metal member normally extends in closely spaced relation to the substrate and has only a few thousands of an inch spacing between the capacitor source and detect plates so that the accelerometer device provides sharp change in capacitance with fast response to acceleration of the device and so that a film of air between the metal member and the substrate provides squeeze film damping to limit vibration of the metal member in the device.

In one preferred embodiment of the invention as indicated in FIG. 4, a shim means 34 is disposed between the attachment plate portion of the metal member and source connector means 22 on the substrate to determine the spacing of the capacitor source and detect plates. Preferably the shim means is soldered, brazed, welded or epoxied or the like to the attachment plate portion of the member and to the source plate connector means. Preferably the shim and member are secured as indicated at 36 using a thin, strong, gold-tin solder having a relatively low coefficient of thermal expansion. In that arrangement, the solder regulating slots 32.7 aid in achieving a thin solder connection and permit visual observation of the solder under the attachment portion of the member to assure proper extent of the solder connection. Alternately, if desired, rivet means 38 or other conventional attachment means are used to secure the attachment plate portion 28 of the metal member to the shim 34 and source plate connector means as shown in FIG. 5. In another preferred embodiment of the invention, the metal plate member 26 is preferably etched, coined or machined so that the source plate portion 30 thereof is reduced in thickness preferably on both sides, as indicated at 30.1, 30.2 in FIG. 6, whereby, when the attachment plate portion 28 of the member is secured to the source plate connector means 22 with a thin, strong, gold-tin solder 36 as shown (or with rivet means or the like), the space between the source plate and detect plate of the device capacitor is precisely determined, the very thin solder thickness being relied on only to secure the member to the substrate so that very precise spacing of the capacitor plate is achieved.

Figure 6:
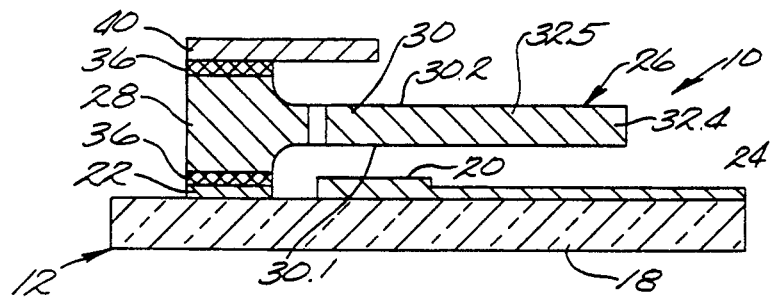
FIGS. 6 and 6A are partial section views similar to FIG. 4 illustrating other alternate embodiments of the accelerometer device of the invention.
Figure 6A:
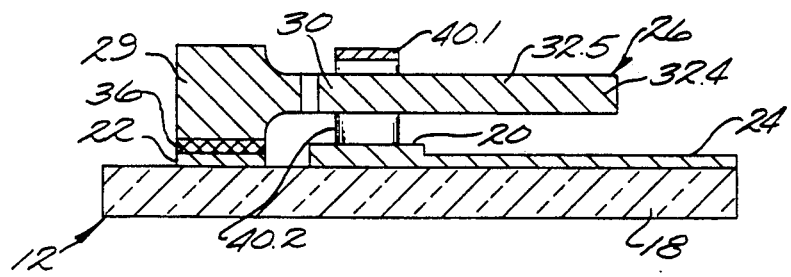

In a preferred embodiment of the invention, stop means 40 are also provided on the attachment portion of the metal member to extend over the source portion of the member to limit movement of the source plate 30 away from the detect plate 20 in response to device acceleration. If desired, the stop is attached with solder 36 as shown in FIG. 6 or with the rivets 38 and a shim 39 as shown in FIG. 5. Preferably the stop means comprises a stop plate 40.1 having a pair of legs 40.2 (only one of which is shown in FIG. 6A) which are disposed at opposite sides of the source plate 30 as shown in FIG. 6A and secured to a metallization pad or the like (not shown) on the substrate 18 by solder or rivet means as will be understood. Preferably the stop 40 or 40.1 is spaced closely over the source plate 30 to achieve some corresponding squeeze film air damping of the metal member to limit member vibration. Preferably a cover 41 of a polyamide material for example is secured to the substrate over the member 26 to exclude particles and other extraneous materials from the member area during subsequent manufacture and calibration of the device and unit and during use of the unit over a long-service life. See FIGS. 1 and 3.

Figure 7:
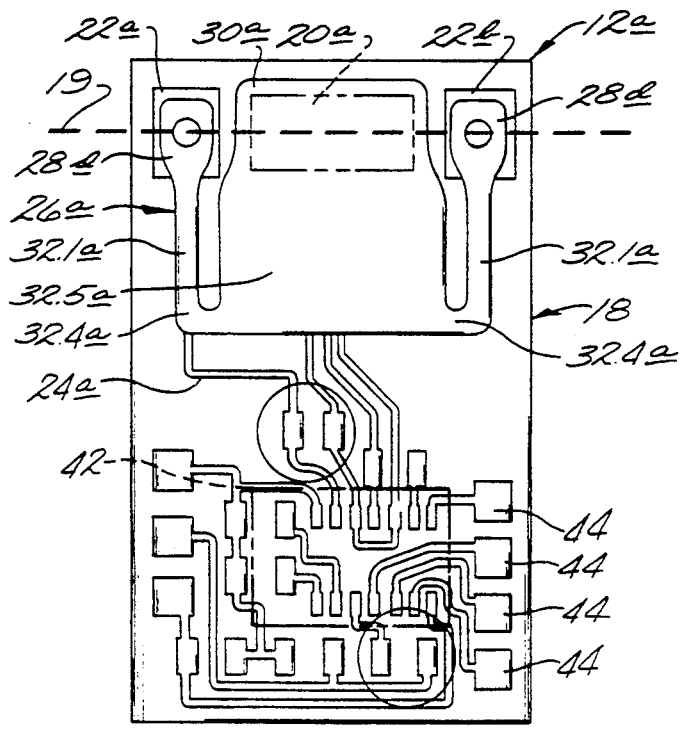
FIG. 7 is a top plan view similar to FIG. 2 illustrating another alternate embodiment of the accelerometer device of the device.

In one alternate preferred embodiment 12a of the invention as shown in FIG. 7, wherein corresponding features have corresponding reference numerals a pair of source plate connector means 22a, 22b are provided along a common line 19 with, and at either side of, the detect plate 20a, and the metal member 26a has two attachment portions 28a, 28b connected to the respective source plate connector means so that the source plate 30a is movable along a vertical axis (extending into the paper as viewed in FIG. 7) intersecting that common line.

Electronic means are connected to the circuit path means 24 to provide the accelerometer device with an electrical circuit capable of providing an output signal from the device corresponding to the device acceleration as will be understood. Preferable for example, an integrated circuit unit 42 and device terminal pads 44 are provided on the substrate 18 and connected to the circuit path means 24 in any conventional manner. The device terminals are adapted to connect the device to a power source to apply a selected voltage to the device capacitor so that the device circuit provides an output signal corresponding to the initial device capacitance and modifies that output signal as a function of device acceleration as movement of the source plate 30 modifies device capacitance in response to such acceleration. Preferably the integrated circuit is of known type adapted to be calibrated relative to device capacitance by electrical input to the integrated circuit unit after the accelerometer device is mounted with the accelerometer housing. That is, the housing cover is preferably provided with a port 46 aligned with the integrated circuit unit 42 so that test probes (not shown) are connected to the integrated circuit in known manner through the port 46. The device is then subjected to a selected acceleration force (by turning the device over e.g.) and the device is calibrated with the test probes relative to that acceleration force. The probes are then withdrawn and the port is sealed with an RTV sealant or the like as indicated at 48 to provide a finished accelerometer unit 10. Leads 49 from the electronics (only one of which shown) are typically led through a hole in the cover as shown and sealed therein with the sealant 48 as indicated in FIG. 1 to connect the unit to a power source and to provide the desired output signal.

Figure 8:
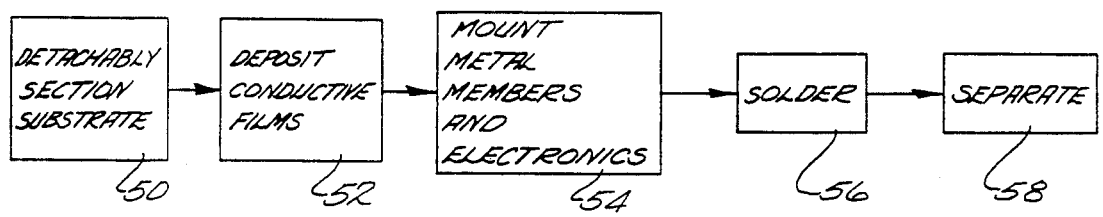
FIG. 8 is a block diagram illustrating the method of the invention for making the accelerometer device.
Figure 9:
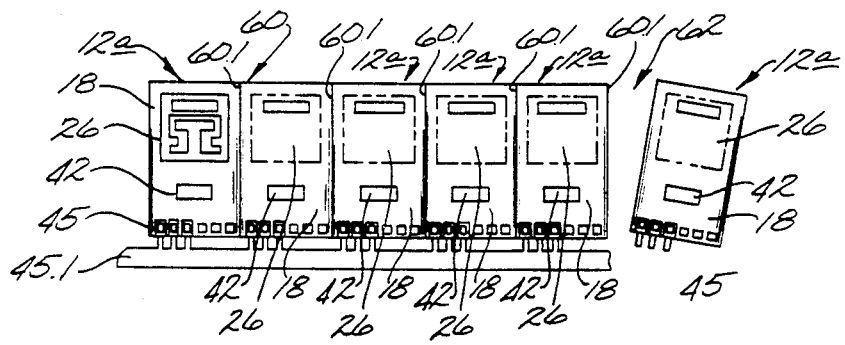
FIG. 9 is a plan view of a plurality of the accelerometer devices of the invention illustrating a step in the method of FIG. 8.

In a preferred method for making the accelerometer devices 12, a sheet of substrate material is processed as indicated at 50 in FIG. 8 to define a plurality of detachably connected substrate sections within the sheet. Electrically conductive film means or the like are then deposited on all of the substrate sections at the same time to define a capacitor detect plate, a source plate connector means, and circuit paths on each of the substrate sections as indicated at 52 in FIG. 8. A plurality of metal members 26 and electronic means 42 as previously described, together with shim means 34, stop means 40, terminals 44 and/or rivet means, are then deposited on each of the substrate sections as indicated at 54 in FIG. 8, and all of the sections are then subjected to conventional wave soldering techniques or to brazing, welding or epoxying or the like at the same time as indicated at 56 in FIG. 8 for electrically connecting the capacitor detect plate and the source plate to the circuit path means 24 on each of the substrate sections. If desired, the shim means, metal members and stop means are also adapted to be soldered (as previously described) in the same step in which the detect plate and source plate connector means are soldered to the circuit paths 24. The substrate sections 18 are then separated from each other as indicated at 58 in FIG. 8 to provide a plurality of accelerometer devices 12 having very uniform properties. Preferably for example, as shown diagrammatically in FIG. 9, a sheet 60 of ceramic substrate material is scribed as indicated at 60.1 to divide the sheet into a plurality of detachably connected substrate sections 18. The substrate sheet is subjected to conventional metal deposition and/or etching techniques to provide (as shown in FIG. 3) detect plates 20, source plate connectors 22, and circuit paths 24 on each of the substrate section at the same time and metal members 26 and electronic means 42 are disposed on each of the substrate sections as previously described. Shim means 34 and stop means 40 are also arranged on each substrate section as previously described. In one preferred embodiment electrically conductive metal terminal pins 45 are provided on a carrier strip 45.1 extending in a common direction along the carrier strip and the carrier strip is disposed on the substrate sheet so that selected terminals are aligned with selected portions of the circuit paths 24 (corresponding to the pads 44) on each of the substrate sections 18. The metal members, shim means, stops, terminals and electronic means are then simultaneously subjected to wave soldering, and after such soldering, the carrier strip 45.1 is removed from the terminals; and the substrate sections are separated as indicated at 62 along the scribe lines to provide the accelerometer devices of the invention as indicated at 12a in FIG. 9.

In that arrangement, each of the accelerometer devices is adapted to be precisely and accurately manufactured at low cost, each device is of rugged and reliable structure and is adapted to be easily mounted in and sealed in a unit housing, and each unit is also easily calibrated in known manner.

It should be understood that although particular embodiments of the accelerometer device, unit and method of manufacture have been described by way of illustrating the invention, this invention includes all modifications and equivalents of the disclosed embodiments falling within the scope of the appended claims.

We claim:

1. An accelerometer device comprising an electrically insulating substrate having electrically conductive surface portion for defining a capacitor detect plate, a capacitor source plate connector member adjacent to the detect plate, and circuit path means for providing electric connection to the detect plate and the source plate connector member and to be connected in an electrical circuit; an electrically conductive metal plate member having an attachment plate portion secured in electrically conductive relation to the source plate connector member, a capacitor source plate portion, and integral, resilient beam means for supporting and precisely positioning the source plate portion and extending between the attachment plate and source plate portion of the member, the beam means including first beam portions extending away from the attachment plate portion to dispose distal ends of the first beam portions at a location spaced from the attachment plate portion, and a second beam portion extending back from the distal ends of the first beam portions toward the attachment plate portion to dispose the capacitor source plate portion of the member in close proximity to the attachment plate portion in selected spaced relation to the detect plate to form a capacitor normally having selected capacitance and to permit movement of the source plate member portion to modify the capacitance in response to device acceleration; and electronic means connected to the circuit path means to provide an output signal corresponding to device acceleration.

2. An accelerometer device according to claim 1 having shim means secured between the attachment plate portion of the member and the capacitor source plate connector member for normally disposing the capacitor source plate portion of the member in said selected spaced relation to the detect plate.

3. An accelerometer device according to claim 2 wherein the shim means is secured to the capacitor source plate connector and the attachment plate portion of the member with an attachment selected from the group consisting of solder, weld, braze and epoxy attachment means.

4. An accelerometer device according to claim 2 wherein rivet means secure the shim means and the attachment plate portion of the member to the capacitor source plate connector means.

5. An accelerometer device according to claim 1 wherein the attachment plate portion of the member is relatively thicker than the capacitor source plate portion of the member for normally disposing the capacitor source plate portion of the member in said selected spaced relation to the detect plate.

6. An accelerometer device according to claim 5 wherein the attachment plate portion of the member is soldered to the capacitor source plate connector member.

7. An accelerometer device according to claim 5 wherein rivet means secure the attachment plate portion of the member to the capacitor source plate connector member.

8. An accelerometer device according to claim 2 having a stop secured to the attachment plate portion of the member extending over the capacitor source plate portion of the member in spaced relation thereto for limiting movement of the capacitor source plate portion of the member away from the detect plate in response to device acceleration.

9. An accelerometer device according to claim 8 wherein the shim means is secured to the capacitor source plate connector member and the attachment plate portion of the member and the stop is secured to the attachment plate portion of the member with an attachment selected from the group consisting of solder, weld, braze and epoxy attachment means.

10. An accelerometer device according to claim 8 wherein rivet means secure the stop, shim means and attachment plate portion of the member to the capacitor source plate member.

11. An accelerometer device according to claim 5 having a stop secured to the attachment plate portion of the member extending over the capacitor source plate portion of the member in spaced relation thereto for limiting movement of the capacitor source plate portion of the member away from the detect plate in response to device acceleration.

12. An accelerometer device according to claim 11 wherein the attachment plate portion of the member is secured to the capacitor source plate connector member and the stop is secured to the attachment source plate connector with an attachment selected from the group consisting of solder, weld, braze and epoxy attachment means.

13. An accelerometer device according to claim 11 wherein rivet means secure the stop and attachment plate portion of the member to the capacitor source plate connector means.

14. An accelerometer device according to claim 1 wherein the first beam portions comprise a pair of resilient beam elements disposed at respective ends of the attachment plate portion of the member to dispose respective distal ends of the pair of beam metal elements at the location spaced from the attachment plate portion, and the second portion comprises an additional resilient beam element extending from the distal ends of the pair of beam elements toward the attachment plate portion of the member to dispose the capacitor source plate portion of the member in said close proximity to the attachment plate portion and in selected spaced relation to the detect plate.

15. An accelerometer device according to claim 14 wherein the metal plate member has portions thereof relatively smaller than the ends of the attachment plate portion connecting a pair of resilient beam elements to respective ends of the attachment plate portion of the member for isolating the pair of beam elements from stress associated with securing of the attachment plate portion of the member to the capacitor source plate connector means.

16. An accelerometer device according to claim 15 wherein the attachment plate portion of the member is soldered to the capacitor source plate connector means, and the attachment plate portion of the member has a plurality of openings spaced therein for permitting the solder to extend through the openings to enhance uniform securing of the attachment plate portion of the member to the capacitor source plate connector means.

* * * * *